United States Patent
Case

(10) Patent No.: US 7,193,753 B2
(45) Date of Patent: Mar. 20, 2007

(54) REVERSE DIFFUSION DIGITAL HALFTONE QUANTIZATION

(75) Inventor: Robert M. Case, Canyon Lake, TX (US)

(73) Assignee: Skyward Optics LLC, Las Vegas, NV (US)

( * ) Notice: Subject to any disclaimer, the term of this patent is extended or adjusted under 35 U.S.C. 154(b) by 961 days.

(21) Appl. No.: 10/345,601

(22) Filed: Jan. 16, 2003

(65) Prior Publication Data

US 2005/0179950 A1    Aug. 18, 2005

(51) Int. Cl.
*H04N 1/46* (2006.01)

(52) U.S. Cl. .................................... 358/534; 382/252

(58) Field of Classification Search ................ 358/534, 358/3.03, 3.04, 3.05, 3.06, 3.26, 1.9; 382/252, 382/275

See application file for complete search history.

(56) References Cited

U.S. PATENT DOCUMENTS

| | | | |
|---|---|---|---|
| 6,002,493 A | 12/1999 | Case | 358/455 |
| 7,079,290 B2 * | 7/2006 | Crossland et al. | 358/3.13 |
| 2003/0081256 A1 * | 5/2003 | Wang et al. | 358/3.06 |
| 2005/0012964 A1 * | 1/2005 | Kress | 358/3.06 |

OTHER PUBLICATIONS

Villarreal, "Quality and Compressibility of Checkerboard-Based Digital Halftoning Algorithms" Thesis, Master of Science in Computer Science, Southwest Texas State University, 2002, pp. 47-56.
Adler, et al, "The Mathematics of Halftoning" International Business Machines Journal of Research and Development, vol. 47, No. 1, 2003, pp. 5-15.

* cited by examiner

*Primary Examiner*—Twyler Lamb
*Assistant Examiner*—Jacky X. Zheng

(57) ABSTRACT

An improved digital halftoning method that uses an input image's global gray levels to determine the local gray levels of a monochrome output image. Input multi-bit pixels grouped into two-pixel-by-two-pixel local subcells are variously aggregated into one or more larger supercells. The size of said supercell(s) is related to and limited by the size of the global input bitmap. A final monochrome gray level is derived from said supercell(s) and distributed within contained subcells. Subcell gray levels are expressed as interim whole monochrome pixels and gray level remainders. A comparison is made of the final supercell and the summed interim subcell monochrome gray levels. An ordering of the remainders is used for assignment of additional monochrome pixels, if necessary, to yield final subcell monochrome gray levels. Gray level rounding errors thus are quantized by reverse diffusion until a monochrome gray level for each of the global image's two-pixel-by-two-pixel local subcells is derived.

1 Claim, 13 Drawing Sheets

| 150 | 158 | 121 | 89  | 44  | 28  | 44 | 93 |
|-----|-----|-----|-----|-----|-----|----|----|
| 255 | 255 | 255 | 239 | 182 | 93  | 52 | 20 |
| 255 | 255 | 255 | 239 | 195 | 125 | 65 | 40 |
| 255 | 255 | 255 | 255 | 255 | 186 | 89 | 44 |
| 235 | 231 | 239 | 227 | 203 | 178 | 89 | 44 |
| 170 | 174 | 174 | 170 | 150 | 113 | 65 | 36 |
| 117 | 121 | 121 | 121 | 113 | 85  | 52 | 36 |
| 81  | 81  | 60  | 69  | 73  | 93  | 77 | 69 |

*Fig 2A*

| 818  | 704  | 347 | 209 |
|------|------|-----|-----|
| 1020 | 1004 | 761 | 238 |
| 810  | 810  | 644 | 234 |
| 400  | 371  | 364 | 234 |

| I=13W<br>R=231<br>F=14W | I=6W<br>R=25<br>F=6W |
|---|---|
| I=9W<br>R=96<br>F=9W | I=5W<br>R=201<br>F=6W |

| I=3W R=53 F=3W | I=2W R=194 F=3W | I=1W R=92 F=1W | I=0W R=209 F=1W |
|---|---|---|---|
| I=4W R=0 F=4W | I=3W R=239 F=4W | I=2W R=251 F=3W | I=0W R=238 F=1W |
| I=3W R=45 F=3W | I=3W R=45 F=3W | I=2W R=134 F=3W | I=0W R=234 F=1W |
| I=1W R=145 F=2W | I=1W R=116 F=1W | I=1W R=109 F=1W | I=0W R=234 F=1W |

| 255 | 255 | 255 | 255 | 255 | 255 | 255 | 255 |
|---|---|---|---|---|---|---|---|
| 255 | 255 | 255 | 255 | 255 | 255 | 255 | 254 |
| 255 | 255 | 255 | 255 | 255 | 252 | 235 | 210 |
| 255 | 255 | 255 | 248 | 254 | 230 | 184 | 143 |
| 255 | 241 | 208 | 176 | 154 | 109 | 54 | 28 |
| 224 | 193 | 146 | 105 | 86 | 57 | 43 | 33 |
| 196 | 180 | 128 | 60 | 57 | 38 | 27 | 18 |
| 166 | 214 | 180 | 126 | 69 | 34 | 23 | 26 |

*Fig 3A*

| 1020 | 1020 | 1020 | 1019 |
|---|---|---|---|
| 1020 | 1013 | 991 | 772 |
| 913 | 635 | 406 | 158 |
| 756 | 495 | 198 | 94 |

*Fig 3B*

| I=4W R=0 F=4W | I=4W R=0 F=4W | I=4W R=0 F=4W | I=3W R=254 F=4W |
|---|---|---|---|
| I=4W R=0 F=4W | I=3W R=248 F=4W | I=3W R=226 F=4W | I=3W R=7 F=3W |
| I=3W R=148 F=3W | I=2W R=125 F=2W | I=1W R=151 F=2W | I=0W R=158 F=1W |
| I=2W R=246 F=3W | I=1W R=240 F=2W | I=0W R=198 F=1W | I=0W R=94 F=0W |

| 31 | 28 | 24 | 29 | 28 | 27 |
|----|----|----|----|----|----|
| 29 | 29 | 32 | 35 | 29 | 31 |
| 33 | 34 | 31 | 32 | 30 | 28 |
| 37 | 42 | 32 | 33 | 34 | 31 |
| 43 | 44 | 36 | 39 | 45 | 41 |
| 43 | 46 | 45 | 43 | 48 | 43 |
| 52 | 61 | 55 | 48 | 47 | 45 |
| 69 | 68 | 59 | 65 | 61 | 57 |
| 79 | 60 | 56 | 79 | 83 | 66 |
| 79 | 63 | 64 | 81 | 72 | 60 |
| 71 | 76 | 77 | 71 | 59 | 59 |
| 66 | 73 | 73 | 61 | 59 | 76 |

*Fig 4A*

| 117 | 120 | 115 |
|-----|-----|-----|
| 146 | 128 | 123 |
| 176 | 163 | 177 |
| 250 | 227 | 210 |
| 281 | 280 | 281 |
| 286 | 282 | 253 |

*Fig 4B*

| I=0W R=117 F=0W | I=0W R=120 F=0W | I=0W R=115 F=0W |
|---|---|---|
| I=0W R=146 F=1W | I=0W R=128 F=0W | I=0W R=123 F=1W |
| I=0W R=176 F=1W | I=0W R=163 F=1W | I=0W R=177 F=1W |
| I=0W R=250 F=1W | I=0W R=227 F=1W | I=0W R=210 F=1W |
| I=1W R=26 F=1W | I=1W R=25 F=1W | I=1W R=26 F=1W |
| I=1W R=31 F=1W | I=1W R=27 F=1W | I=0W R=253 F=1W |

REVERSE DIFFUSION DIGITAL HALFTONE QUANTIZATION

FEDERALLY SPONSORED RESEARCH

Not Applicable.

SEQUENCE LISTING OR PROGRAM

Not Applicable.

BACKGROUND

1. Field of Invention

My invention relates to digital halftoning, specifically to the distribution of monochrome pixels within a digital halftone cell.

2. Description of Prior Art

Digital halftoning seeks to render complex images using a monochrome bitmap. Within this graph paper-like grid, each square picture element or pixel is designated one of two "colors." Said colors are usually (but not limited to) black and white. Each pixel then may be represented by the binary numbers 0 or 1.

A reproduction of an input image appears when human vision fails to distinguish the monochrome pixels. This usually occurs when viewing from a distance. The eye "averages" a group of black and white pixels and interprets it as a level of gray.

The smallest square grouping at which this phenomenon occurs measures two-pixels-by-two-pixels. This four pixel area or cell may depict five levels of gray: 1.) all four pixels black; 2,) three black and one white; 3.) two black and two white; 4.) one black and three white; and 5.) all four white. These five gray levels may be nominally interpreted as 0%, 25%, 50%, 75%, and 100% white, occurring in increments of approximately 25%.

The four corresponding pixels of a 1:1 input bitmap most often are captured at a greater binary pixel-depth. At an arbitrary 8-bits per pixel, each pixel may display a gray level range of 0–255. The four-pixel-cell may display a gray level range of 0–1020. This translates into 1021 gray levels in increments of approximately 0.1%.

Comparing specific corresponding four-pixel-cell input and output gray levels, this reduction of 1020 levels to five levels will yield a difference or rounding error. A method developed by Robert W. Floyd, et al, published in "An Adaptive Algorithm for Spatial Grayscale," (Proceeding of the S.I.D. vol. 17/2 Second Quarter [1976] pp. 75–76) is to take this error and spread or "diffuse" it to adjoining input cells. Known as Floyd and Steinberg "error diffusion," the method has become the prevailing method used throughout the digital halftoning industry today.

A problem with error diffusion is that it works well when the errors to be diffused are relatively large. However, when the errors are relatively small, the method allows them to accumulate until they "drop" many cells away from where they first occurred. The result is an artifact, usually in a serpentine shape, that compromises the grayscale accuracy of the output image. Floyd, et al, does not teach how to use all of the input image's pixels to determine the "color" of individual output pixels.

In my previous U.S. patent, "Method for Reproducing an Image" (Case, U.S. Pat. No. 6,002,493 [1999]), I developed a method for pattern selection of monochrome pixels within a cell. In applying my pattern method, I encountered the same rounding error problem that error diffusion seeks to address. Without diffusion of the rounding errors, the size of the output cell dictates the global image's grayscale.

If a four-pixel-by-four-pixel input cell is used at a 1:1 ratio to derive a four-pixel-by-four pixel output cell, the global image will be restricted to just 17 gray levels. They include all black plus the incremental addition of 16 individual white pixels per cell. At a two-pixel-by-two-pixel cell, the global image will be restricted to just 5 gray levels. They include all black plus the incremental addition of 4 individual white pixels per cell. While Case does teach how to determine the "color" of pixels within a digital halftone cell, it does not teach how to use all of the input image's pixels to determine the output monochrome gray level of each cell.

In error diffusion, micro elements are used to determine macro elements. Local monochrome gray levels effectively determine the global monochrome gray levels. In such a scenario, the influences of various micro elements will clash, causing the macro elements to stray from the task of accurately reproducing the input bitmap.

OBJECTS AND ADVANTAGES

Several objects and advantages of the present invention are:

(a) to provide the most accurate global image grayscale reproduction of which a monochrome square pixel of specified size is capable.

(b) to provide the most accurate local grayscale reproduction of which a two-pixel-by-two-pixel monochrome square cell is capable.

(c) to enable all of the pixels in the input global image to optimally affect the grayscale of each local two-pixel-by-two-pixel digital halftone cell.

(d) to accomplish the above efficiently by means of a digital computer.

SUMMARY

According to the present invention, a digital halftone is produced that accurately and efficiently reproduces both the global and local analog gray levels of the input image.

DRAWINGS

Drawing Figures

FIG. 2A shows a square portion of the input bitmap, a supercell, designating the gray level of each contained pixel.

FIG. 2B shows the same supercell, designating the gray level of each contained two-pixel-by-two-pixel subcell.

FIG. 3A shows a second square portion of an input bitmap, a supercell, designating the gray level of each contained pixel.

FIG. 3B shows the same supercell, designating the gray level of each contained two-pixel-by-two-pixel subcell.

FIG. 4A shows a rectangular portion of an input bitmap, a supercell, designating the gray level of each contained pixel.

FIG. 4B shows the same supercell, designating the gray level of each contained two-pixel-by-two-pixel subcell.

REFERENCE DESIGNATIONS IN DRAWINGS

I interim whole monochrome pixels
R gray level remainder
F final derived gray level in whole monochrome pixels
W white monochrome pixel

DERAILED DESCRIPTION

Figure 1:
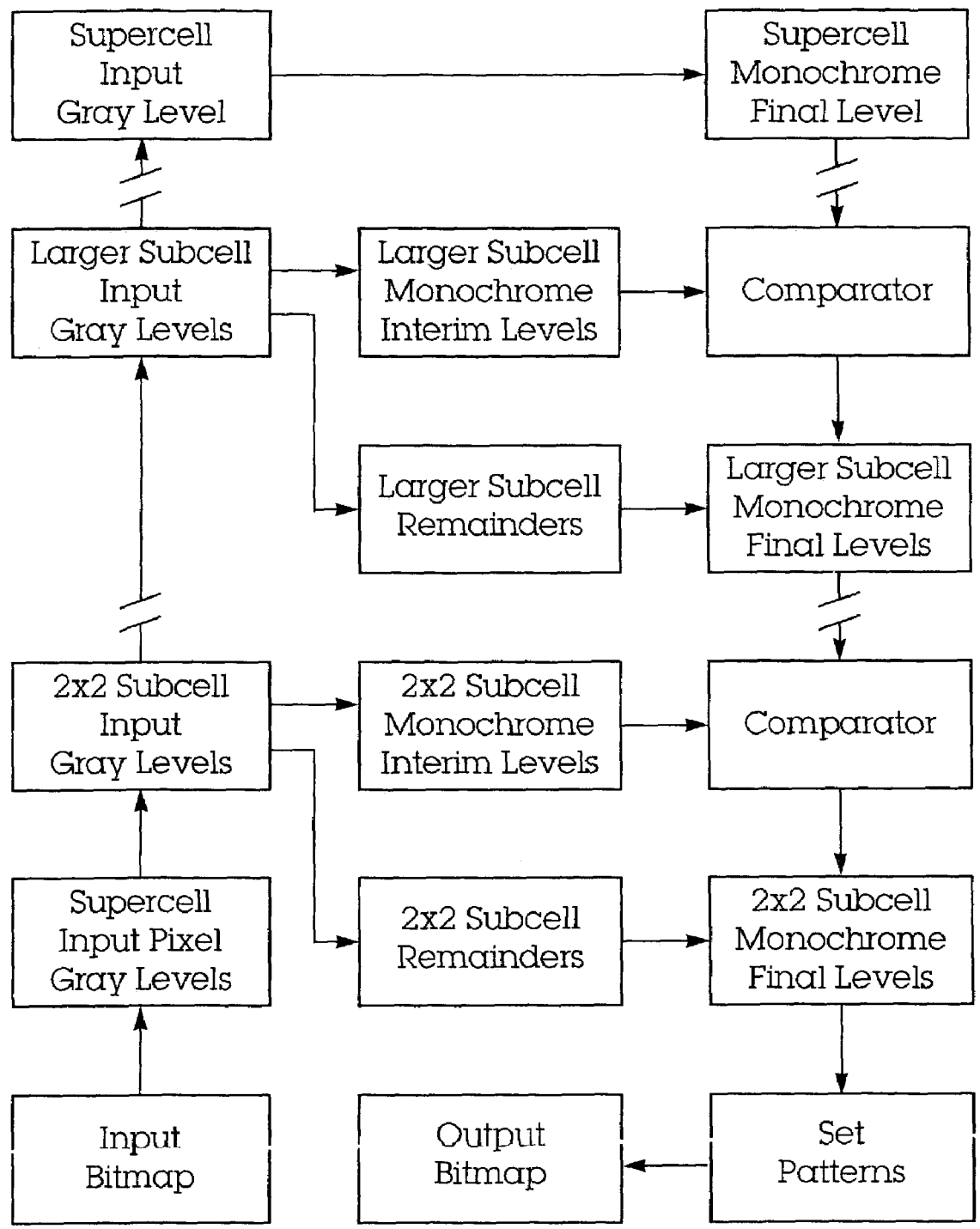
FIG. 1 shows a flow chart of the method of the invention as performed by a binary computing device.

Description—FIG. 1—Flow Chart

An Input Bitmap contains all of an input image's pixels captured at a multi-bit pixel depth. Supercell Input Pixel Gray Levels are derived by subdividing the input bitmap into a number of equal-sized supercells. 2×2 Subcell Input Gray Levels are derived by subdividing each said supercell into two-pixel-by-two-pixel subcells. From said subcells 2×2 Subcell Monochrome Interim Levels and 2×2 Subcell Remainders are derived and are stored separately for later retrieval.

Larger Subcell Input Gray Levels may be derived by grouping contained subcells into a number of equal-sized larger subcells. From said larger subcells are derived Larger Subcell Monochrome Interim Levels and Larger Subcell Remainders, which also are stored separately for later retrieval. Alternatively, this step may be applied several times or omitted, as indicated by the line interruptions. A Supercell Input Gray Level is derived when the grouping of all contained subcells is equal in size to said supercell.

A Supercell Monochrome Final Level is derived from said supercell. For the next subcell level, a Comparator acts on the Supercell Monochrome Final Level and the retrieved Larger Subcell Monochrome Interim Levels. The retrieved Larger Subcell Remainders are then utilized to derive the Larger Subcell Monochrome Final Levels. This operation continues until all of the 2×2 Subcell Monochrome Final Levels are derived.

Set Patterns places the derived final levels into specific patterns within the two-pixel-by-two-pixel monochrome cells. The pattern-setting method to be used is not restricted by the present invention. However, here the teaching of U.S. Pat. No. 6,002,493 by Case, "Method for Reproducing an Image," (1999) is selected. Following the setting of the patterns, the monochrome subcells are recombined into a monochrome Output Bitmap.

FIGS. 2A–2H—Preferred Embodiment

FIG. 2A shows a square portion of the global image designated as a supercell. Each of the 64 pixels contained within is designated an input 8-bit gray level.

FIG. 2B shows the grouping of individual pixels into square two-pixel-by-two-pixel subcells. Each of the 16 subcells is designated a summed input gray level.

Figures 2C, 2D:
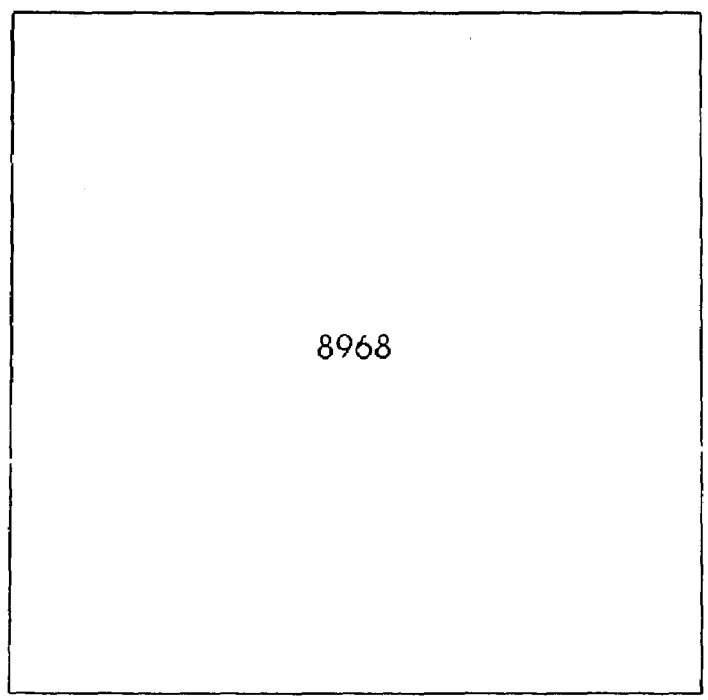
FIG. 2C shows the supercell, designating the gray level of each of a number of contained larger subcells.
FIG. 2D shows the supercell, designating its overall gray level.

FIG. 2C shows the grouping of subcells into larger square four-pixel-by-four-pixel subcells. Each of the four larger subcells is designated a summed input gray level.

FIG. 2D shows the grouping of larger subcells into the original supercell. The supercell is designated a summed input gray level.

Figures 2E, 2F:
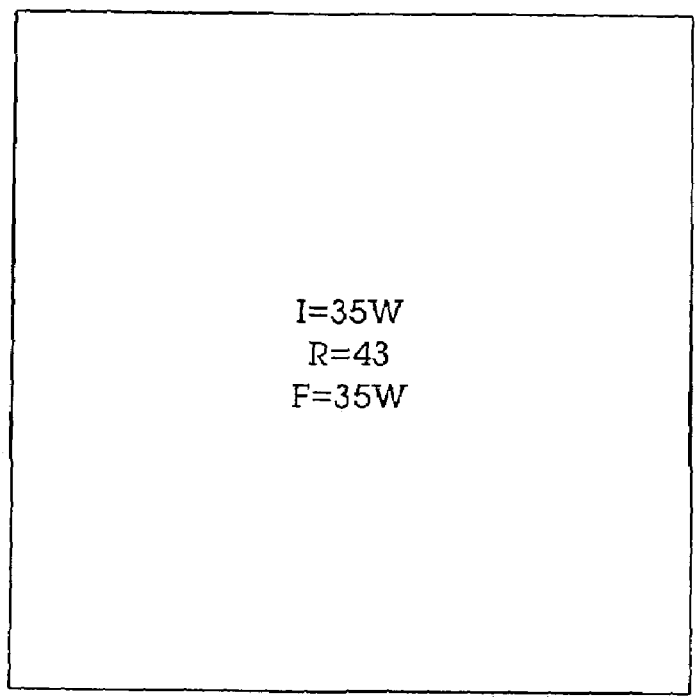
FIG. 2E shows the supercell, designating a final monochrome gray level.
FIG. 2F shows the supercell, designating final monochrome gray levels for each of the contained larger subcells.

FIG. 2E shows the derivation of the supercell monochrome final level. The supercell is designated: I a monochrome interim level expressed in white pixels, plus R a gray level remainder, and F a monochrome final level expressed in white pixels.

FIG. 2F shows the derivation of the larger subcell monochrome final levels for the 4 four-pixel-by-four-pixel subcells within the supercell. Each subcell has been designated: I a monochrome interim level expressed in white pixels, plus R a gray level remainder, and F a monochrome final level expressed in white pixels.

Figures 2G, 2H:
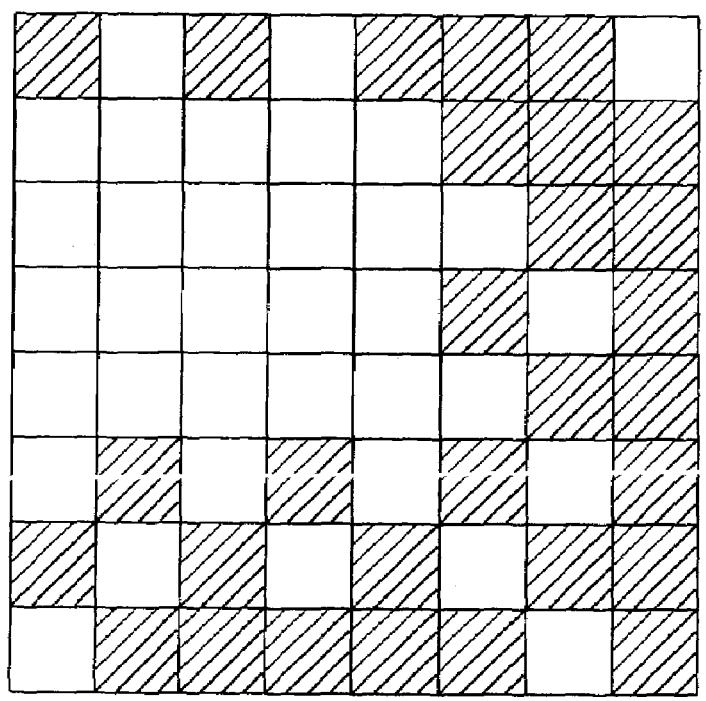
FIG. 2G shows the supercell, designating final monochrome gray levels for each of the contained two-pixel-by-two-pixel subcells.
FIG. 2H shows the supercell with the setting of monochrome two-pixel-by-two-pixel subcell patterns.

FIG. 2G shows the derivation of the subcell monochrome final levels for the 16 two-pixel-by-two-pixel subcells. Again each subcell has been designated: I a monochrome interim level expressed in white pixels, plus R a gray level remainder, and F a monochrome final level expressed in white pixels.

FIG. 2H shows the setting of monochrome patterns for each two-by-two subcell according to U.S. Pat. No. 6,002, 493 by Case, "Method for Reproducing an Image," 1999.

FIGS. 3A–3F—Additional Embodiment

An additional embodiment is shown in FIGS. 3A–3F; in this case all of the two-pixel-by-two-pixel subcells immediately are grouped into a supercell. No interim larger subcells are used. This additional embodiment shows how a supercell of any size may be directly linked to the two-pixel-by-two-pixel local subcells.

FIGS. 4A–4J—Alternative Embodiment

Figures 4C, 4D:
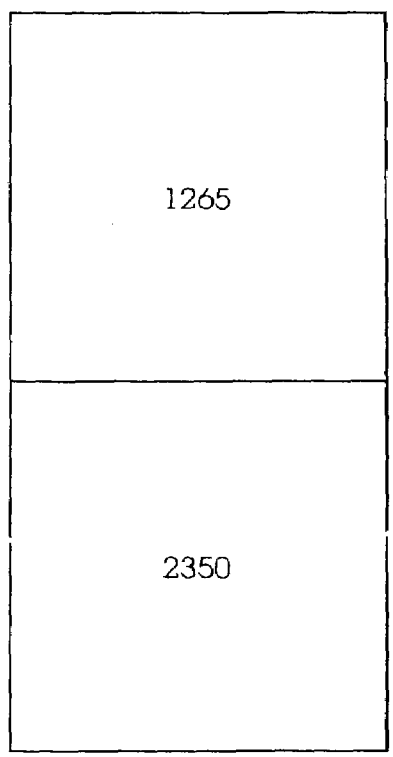
FIG. 4C and FIG. 4D show the supercell, designating the gray level of each of a number of contained larger subcells.
Figure 4E:
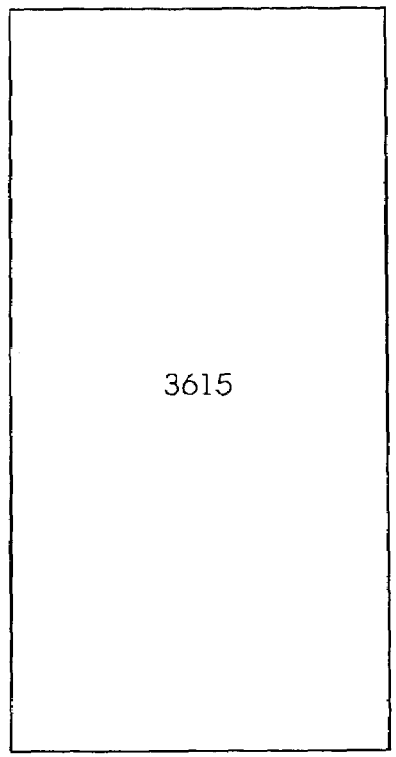
FIG. 4E shows the supercell, designating its overall gray level.

An alternative embodiment is shown in FIGS. 4A–4J; in this case the supercell is not square but rectangular. Two levels of interim larger subcells are shown: FIG. 4C shows the 18 two-pixel-by-two-pixel subcells grouped into 6 two-pixel-by-six-pixel larger subcells and FIG. 4D shows those larger subcells grouped into 2 six-pixel-by-six-pixel larger subcells.

This alternative embodiment shows how a rectangular supercell of any size may use a number of interim larger subcells to finally derive the two-pixel-by-two-pixel local subcells. Note that at each interim level, the larger subcells are of equal dimensions.

Advantages

From the description above, a number of advantages of my reverse diffusion digital halftoning become evident:

(a) The analog gray level of both the global input image and the local two-pixel-by-two-pixel input cells is reproduced more accurately by a monochrome bitmap.

(b) The method of separating local monochrome partial pixel remainders and using them to determine local whole monochrome pixel gray levels is tailored to efficient execution by a digital computer.

(c) This combination of accuracy and efficiency yields better monochrome grayscale reproduction of analog images in less time.

Operation

The subject of the operation of the current invention is an image expressed as an Input Bitmap (FIG. 1). This bitmap has been captured by a scanner, a digital camera or similar device. It is of a specified width and height expressed in pixels. Each dimension is divisible by two to contain two-pixel-by-two-pixel subcells evenly. Each pixel has a specified analog gray level expressed as a binary number. The size of the binary number determines the number of gray levels possible within each pixel.

This input bitmap may be subdivided into a number of supercells of equal size.

These supercells are of a specified width and height. (Note that the entire input bitmap may be considered the supercell.) The supercell in FIG. 2A is eight pixels wide by eight pixels high, containing 64 pixels. The discrete gray level of each of the 64 pixels is designated as Supercell Input Pixel Gray Levels (FIG. 1). In FIG. 2A, each pixel has been captured with an 8-bit binary number and thus exhibits a gray level range of 0–255 (0=black, 255=white).

Operation—Two-Pixel-By-Two-Pixel Subcells

The input supercell then is subdivided into two-pixel-by-two-pixel subcells. The gray level of each subcell's four contained pixels is summed. This sum is the gray level of the subcell, designated 2×2 Subcell Input Gray Levels (FIG. 1). In FIG. 2B, the gray level sums are shown for each of the supercell's contained 16 subcells. The gray level range of each of the four-pixel subcells is 0–1020 (0=black, 1020=white).

Each of the 16 subcell gray level sums then is divided by one whole mono-chrome output white pixel. At 8-bits per pixel, this divisor is 255. Each of the results is specified in interim whole monochrome white pixels and a gray scale remainder of less than 255. The whole pixel integers, designated 2×2 Subcell Monochrome Interim Levels (FIG. 1) are stored for later retrieval. The gray scale remainders, designated 2×2 Subcell Remainders (FIG. 1), also are stored for later retrieval.

The gray levels of all of the subcells now may be summed and designated the Supercell Input Gray Level (FIG. 1). (The option of doing this is designated by the broken lines in FIG. 1). However, the preferred embodiment of the invention is to group the two-pixel-by-two-pixel subcells into one or more levels of larger subcells of equal dimensions so that each contains the same number of antecedent subcells. In FIG. 2C, the larger subcells are made up of four two-pixel-by-two-pixel subcells and are 4 pixels wide and 4 pixels high. The gray level sums of each of the larger subcell's four contained two-pixel-by-two-pixel subcells now are summed and designated Larger Subcell Input Gray Levels (FIG. 1). The gray level range of each larger subcell is 0–4080 (0=black, 4080=white).

Each of the supercell's four larger subcell gray level sums then is divided by one whole monochrome output white pixel, 255. Each of the results is specified in interim whole monochrome white pixels and a gray scale remainder of less than 255. The whole pixel integers, designated Larger Subcell Monochrome Interim Levels (FIG. 1) are stored for later retrieval. The gray scale remainders, designated Larger Subcell Remainders (FIG. 1), also are stored for later retrieval. Now the supercell's four larger subcells' gray levels are summed and designated the Supercell Input Gray Level (FIG. 1). The supercell's gray level range is 0–16,320 (0=black, 16,320=white). This sum then is divided by one whole monochrome output white pixel, 255. The result again is specified in interim whole monochrome white pixels and a gray scale remainder of less than 255. The whole pixel integer and the grayscale remainder is processed to determine the final monochrome level of the supercell.

Operation—Whole Monochrome Pixels

Only at the supercell level is rounding up or down to the nearest whole monochrome white pixel allowed. The supercell's input gray level of 8968 divided by 255 equals 35 interim whole monochrome white pixels I plus a remainder of 43 R, as shown in FIG. 2E. If the remainder is less than ½ whole monochrome white pixel, or 127.5, rounding down occurs and the remainder is discarded. If the remainder is greater than 127.5, rounding up occurs and the remainder is discarded. In FIG. 2E, the remainder 43 is less than 127.5 and rounding down to 35 whole monochrome white pixels occurs F. This result is designated the Supercell Monochrome Final Level (FIG. 1).

Dropping to the next level of subcells, the larger subcells designated above, the previously derived Larger Subcell Monochrome Interim Levels and the Larger Subcell Remainders are retrieved. The upper left of the four subcells has an analog gray level of 3546 (FIG. 2C), which divided by 255 yields 13 interim whole monochrome white pixels I and a gray level remainder of 231 R, as shown in FIG. 2F. The upper right subcell has an analog gray level of 1555 (FIG. 2C), which divided by 255 yields 6 interim whole monochrome white pixels I and a gray level remainder of 25 R, as shown in FIG. 2F. The lower right subcell has an analog gray level of 1476 (FIG. 2C), which divided by 255 yields 5 interim whole monochrome white pixels I and a gray level remainder of 201 R, as shown in FIG. 2F. The lower left subcell has an analog gray level of 2391 (FIG. 2C), which divided by 255 yields 9 interim whole monochrome white pixels I and a gray level remainder of 96 R, as shown in FIG. 2F.

All of the interim gray level integers are summed yielding an interim gray level for the supercells' four larger subcells. The result is 13+6+5+9=33 interim whole monochrome white pixels. Within the Comparator function (FIG. 1), this result is subtracted from the previously derived Supercell Monochrome Final Level. If there is no difference, the Larger Subcell Monochrome Interim Levels become the Larger Subcell Monochrome Final Levels and the Larger Subcell Remainders are discarded. If there is a difference, the shortfall in whole pixels is distributed among the four larger subcells, one pixel per subcell until parity is reached.

Here the supercell final level is 35 (FIG. 2E) and the corresponding interim level for the four larger subcells is 33 (FIG. 2F), a difference of 2 whole monochrome white pixels. These 2 pixels now are distributed, one pixel per subcell, according to a sorting of the Larger Subcell Remainders. The subcells with the largest remainders, indicating the "whitest" subcells, receive the distributed whole pixels. In FIG. 2F, the upper left subcell has the largest remainder, 231, so its interim level of 13 is increased one pixel to 14 final monochrome whole white pixels F. Now the shortfall is just one pixel. The lower right subcell has the next largest remainder, 201, so its interim level of 5 is increased one pixel to 6 final whole monochrome white pixels F, also shown in FIG. 2F.

The Supercell Monochrome Final Level and the contained Larger Subcell Monochrome Final Levels now are at parity, so the remaining unaltered Larger Subcell Monochrome Interim Levels become the Larger Subcell Monochrome Levels (FIG. 1). The upper right larger subcell remains 6 F and the lower left larger subcell remains 9 F (FIG. 2F).

At this point each of the larger subcells becomes a nominal supercell. Each nominal supercell's monochrome final level is used to derive the contained subcells' monochrome final levels according to the method described above. The process continues until all of the image's 2×2 Subcell Monochrome Final Levels have been derived. FIG. 2G shows all 16 of the supercell's two-pixel-by-two-pixel subcells' derived final monochrome levels, Note that their sum equals 35 monochrome whole white pixels, at parity with the Supercell Monochrome Final Level as shown in FIG. 1.

The final monochrome patterns for each of the two-pixel-by-pixel subcell's final level now are set. The possible five levels of each two-pixel-by-two-pixel subcell may be represented by 16 different patterns. Any method may be used to Set Patterns (FIG. 1). The method used in FIG. 2H is the one taught by U.S. Pat. No. 6,002,493 by Case, "Method for Reproducing an Image", (1999).

Following the setting of the patterns for each subcell in the input image, all are reassembled into an Output Bitmap (FIG. 1) with the same dimensions and number of pixels as the Input Bitmap, but constructed of monochrome pixels 1-bit in depth.

Figure 3C:
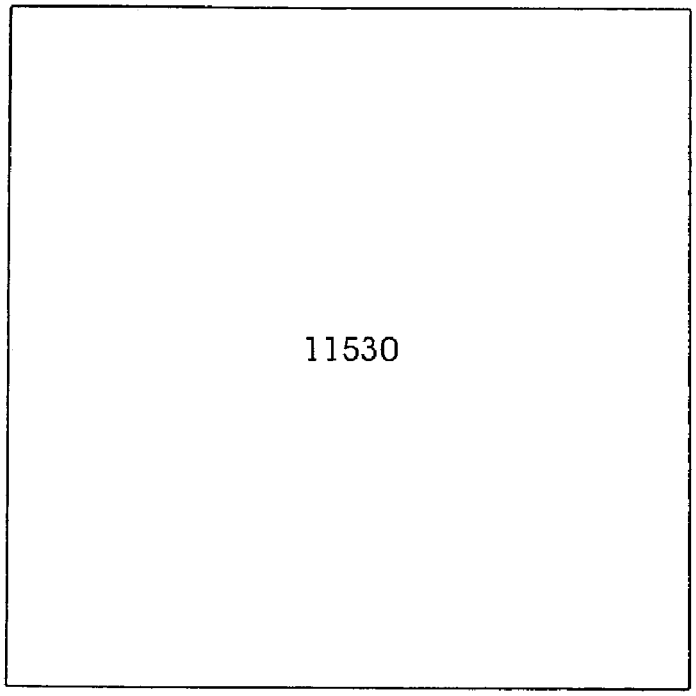
FIG. 3C shows the supercell, designating its overall gray level.
Figure 3D:
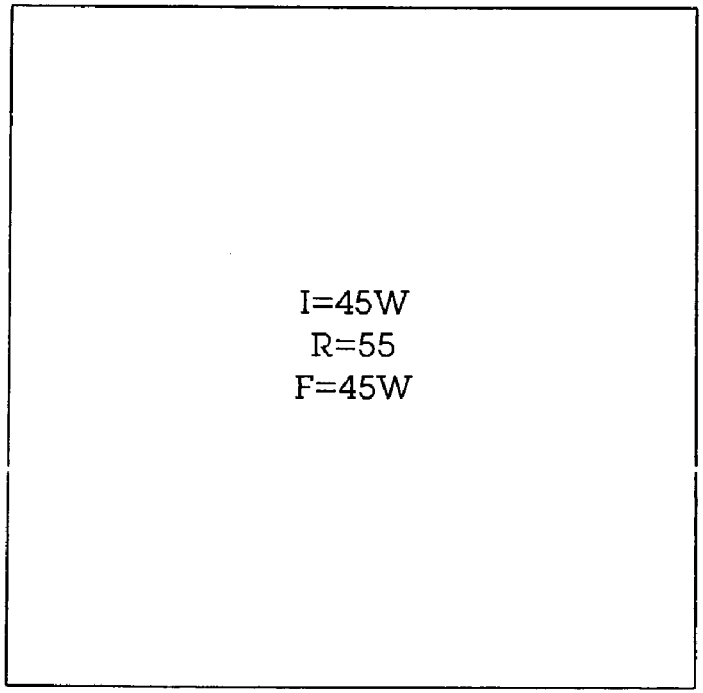
FIG. 3D shows the supercell, designating a final monochrome gray level.
Figures 3E, 3F:
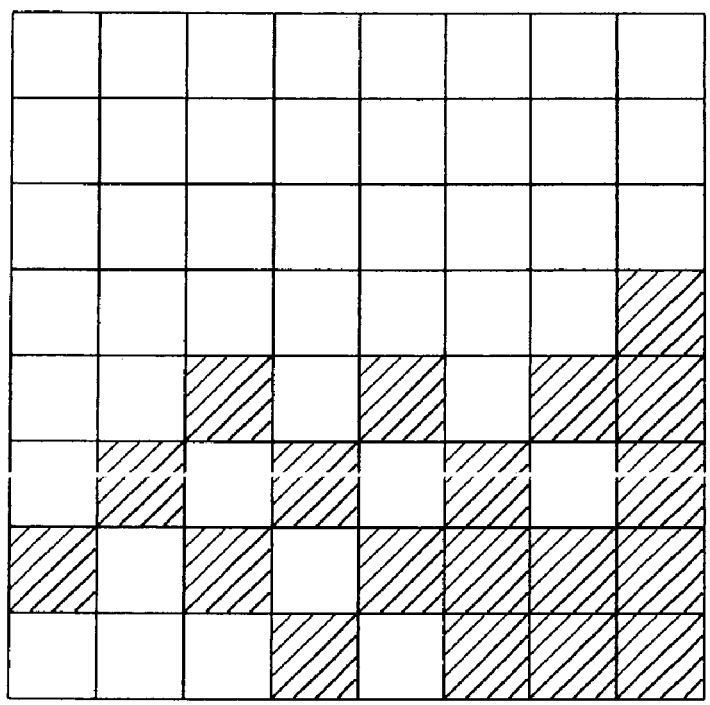
FIG. 3E shows the supercell, designating final monochrome gray levels for each of the contained two-pixel-by-two-pixel subcells.
FIG. 3F shows the supercell with the setting of monochrome two-pixel-by-two-pixel subcell patterns.

The additional embodiment depicted in FIGS. 3A–3F shows how the two-pixel-by-two-pixel input subcells immediately may be grouped into a supercell without using interim larger subcells. Note that the supercell may be as large as the entire global input image. The final monochrome level of the supercell shown in FIG. 3D is determined as above and distributed to the two-pixel-by-two-pixel output subcells through a sorting of all of the subcells' remainders as shown in FIG. 3E.

However, the more layers of interim larger subcells utilized, the more accurate each successive level becomes. When utilizing several levels of larger subcells, it is required that each level's larger subcells be of equal dimensions so that the monochrome gray level comparisons may be made accurately.

The alternative embodiment depicted in FIGS. 4A–4J shows how a number of larger subcells may be used. In FIG. 4A, the supercell is a rectangle. FIG. 4C shows 18 two-pixel-by-two-pixel subcells grouped into 6 two-pixel-by-six-pixel larger subcells that are rectangular and equal-sized. FIG. 4D shows these 6 larger subcells grouped into 2 six-pixel-by-six-pixel larger subcells that are square and equal-sized.

Figure 4F:
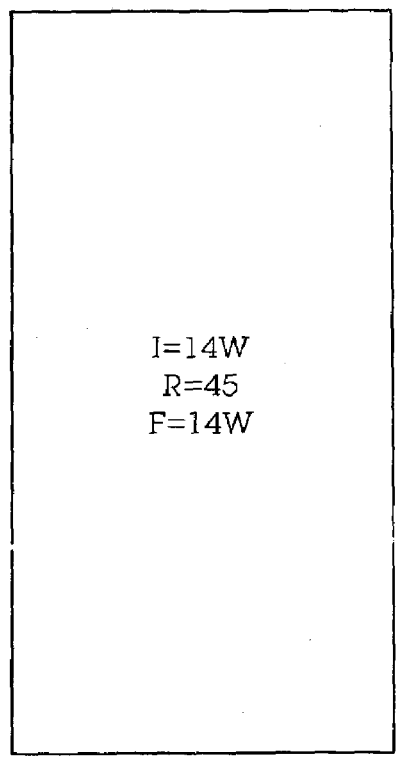
FIG. 4F shows the supercell, designating a final monochrome gray level.
Figures 4G, 4H:
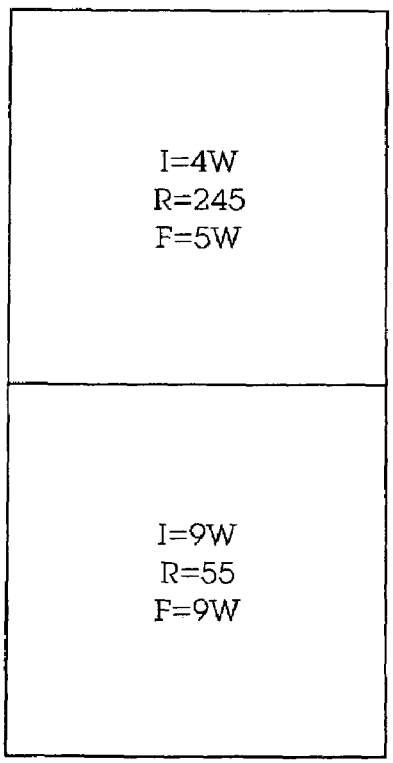
FIG. 4G and FIG. 4H show the supercell, designating final monochrome gray levels for each of the contained larger subcells.
Figures 4I, 4J:
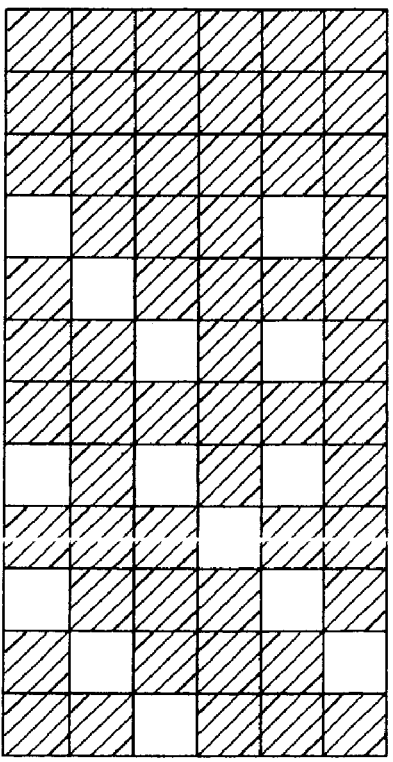
FIG. 4I shows the supercell, designating final monochrome gray levels for each of the contained two-pixel-by-two-pixel subcells.
FIG. 4J shows the supercell with the setting of monochrome two-pixel-by-two-pixel subcell patterns.

Final monochrome gray levels for the supercell are determined as above, as shown in FIG. 4F. Final monochrome gray levels for the subcells at each level again are determined by a sorting of their remainders as shown in FIGS. 4G, 4H and 4I, culminating in the derivation of the final monochrome levels for the two-pixel-by-two-pixel output subcells.

CONCLUSIONS, RAMIFICATIONS, AND SCOPE

Accordingly, the reader will see that the reverse diffusion method of this invention more accurately and efficiently determines the monochrome gray levels for any global input image's output local two-pixel-by-two-pixel halftone subcells. In addition, the monochrome gray levels of multi-pixel supercells of a size up to and including the entire global input image directly are linked to the monochrome gray levels of said subcells.

The method allows the global image's output monochrome gray level to be quantized to within ±½ monochrome pixel of its corresponding input analog gray level. The method also allows each local two-pixel-by-two-pixel output subcell to be quantized to within ±1 monochrome pixel of its corresponding subcell's input analog gray level.

Such accuracy is efficiently enabled on any computing device through the separation of the various subcells' interim whole monochrome pixel gray levels and gray level remainders, and the subsequent allocation of additional whole monochrome pixels, if necessary, using a sorting of said remainders.

Although the description above contains many specificities, those should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A method for producing a digital halftone monochrome output bitmap comprising the steps of:

(a) obtaining an input bitmap of identical dimensions to said output bitmap in pixels high and wide, within which each pixel's analog gray level is expressed as a multi-bit value;

(b) subdividing said input bitmap into a plurality of multi-pixel supercells of identical dimensions in pixels high and wide;

(c) subdividing said supercells into two-pixel-by-two-pixel subcells and determining an analog gray level expressed as a multi-bit value for each of said subcells;

(d) dividing each said subcell gray level by one whole monochrome output pixel expressed as a multi-bit value to yield I, a two-pixel-by-two-pixel subcell monochrome interim level in whole output pixels, and R, a two-pixel-by-two-pixel subcell remainder, a partial pixel gray level expressed as a multi-bit value, for each said subcell;

(e) combining said subcells into a plurality of larger subcells of identical dimensions in pixels high and wide so that all said larger subcells are contained within said supercell;

(f) determining larger subcell analog input gray levels expressed as a multi-bit value for each of said larger subcells;

(g) dividing each said larger subcell gray level by one while monochrome output pixel expressed as a multi-bit value to yield I, a larger subcell monochrome interim level in whole output pixels, and R, a larger subcell remainder, a partial pixel gray level expressed as a multi-bit value, for each said larger subcell;

(h) combining said larger subcells into said supercell and determining an analog supercell input gray level expressed as a multi-bit value;

(i) determining for said supercell a monochrome output final gray level F by dividing its input gray level by one whole monochrome output pixel expressed as a multi-bit value and rounding up or down to the nearest whole pixel;

(j) obtaining a sum of said monochrome interim levels I of said supercell's next smaller contained larger subcells and comparing said sum to said supercell's monochrome output final gray level F;

(k) utilizing a derived shortfall, if any, to determine said larger subcells' individual monochrome output final gray levels F by allocating one whole monochrome output pixel to each of said larger subcells according to a sorting of said larger subcells' remainders R until parity with said supercell is achieved;

(l) obtaining a sum of the monochrome interim levels I of each of said larger subcell's contained two-pixel-by-two-pixel subcells and comparing said sum to said larger subcell's monochrome output final gray level F;

(m) utilizing a derived shortfall, if any, to determine said two-pixel-by-two-pixel subcells' individual monochrome output final gray levels F by allocating one whole monochrome output pixel to each of said two-pixel-by-two-pixel subcells according to a sorting of said two-pixel-by-two-pixel subcells' remainders R until parity with said larger subcell is achieved;

(n) setting the final monochrome output patterns for each of said two-pixel-by-two-pixel subcells; and (o) recombining all of said two-pixel-by-two-pixel monochrome output subcells into said digital halftone monochrome output bitmap.

* * * * *